(12) United States Patent
Isensee et al.

(10) Patent No.: US 8,904,313 B2
(45) Date of Patent: Dec. 2, 2014

(54) GESTURAL CONTROL FOR QUANTITATIVE INPUTS

(75) Inventors: Scott H Isensee, Austin, TX (US);
James L Lentz, Austin, TX (US);
Andree Proulx, Montreal (CA)

(73) Assignee: International Business Machines Corporation, Armonk, NY (US)

( * ) Notice: Subject to any disclaimer, the term of this patent is extended or adjusted under 35 U.S.C. 154(b) by 98 days.

(21) Appl. No.: 13/480,213

(22) Filed: May 24, 2012

(65) Prior Publication Data
US 2013/0318482 A1 Nov. 28, 2013

(51) Int. Cl.
*G06F 3/033* (2013.01)
*G06F 3/00* (2006.01)

(52) U.S. Cl.
USPC .............................. 715/863; 715/865; 715/866

(58) Field of Classification Search
USPC .......................................... 715/863, 865, 866
See application file for complete search history.

(56) References Cited

U.S. PATENT DOCUMENTS

| | | | |
|---|---|---|---|
| 5,877,758 A | 3/1999 | Seybold | |
| 5,903,229 A * | 5/1999 | Kishi | 341/20 |
| 6,204,846 B1 | 3/2001 | Little et al. | |
| 6,286,104 B1 * | 9/2001 | Buhle et al. | 726/4 |
| 6,424,338 B1 * | 7/2002 | Anderson | 345/173 |
| 6,922,816 B1 | 7/2005 | Amin et al. | |
| 7,085,994 B2 | 8/2006 | Gvily | |
| 7,565,623 B2 | 7/2009 | Beam et al. | |
| 7,765,491 B1 | 7/2010 | Cotterill | |
| 7,797,643 B1 | 9/2010 | Jobs et al. | |
| 7,805,685 B2 * | 9/2010 | Cannistraro et al. | 715/833 |
| 8,356,250 B2 * | 1/2013 | Ko | 715/727 |
| 2002/0054695 A1 * | 5/2002 | Bjorn et al. | 382/124 |
| 2003/0210286 A1 | 11/2003 | Gerpheide et al. | |
| 2008/0141181 A1 * | 6/2008 | Ishigaki et al. | 715/863 |
| 2009/0254869 A1 * | 10/2009 | Ludwig et al. | 715/863 |
| 2009/0306784 A1 | 12/2009 | Blum | |
| 2010/0211920 A1 * | 8/2010 | Westerman et al. | 715/863 |
| 2010/0275033 A1 | 10/2010 | Gillespie et al. | |
| 2011/0080351 A1 | 4/2011 | Wikkerink et al. | |
| 2011/0107244 A1 * | 5/2011 | Kinoshita et al. | 715/763 |
| 2011/0246943 A1 | 10/2011 | Fujibayashi | |
| 2011/0254797 A1 * | 10/2011 | Adamson et al. | 345/173 |
| 2012/0144345 A1 * | 6/2012 | Munter et al. | 715/863 |

\* cited by examiner

*Primary Examiner* — Steven Sax
*Assistant Examiner* — Wilson Varga
(74) *Attorney, Agent, or Firm* — Jeffrey T. Holman

(57) ABSTRACT

A method for value specification in a responsive interface control, the method including: displaying an interface control in a user interface on a touch display device, wherein the interface control is an interactive interface element configured to set an interface value selected from an ordered continuum of values; detecting a shape of a touch gesture input on the interface control on the touch display device; and changing the interface value in response to detecting a change in the shape of the gesture input.

17 Claims, 5 Drawing Sheets

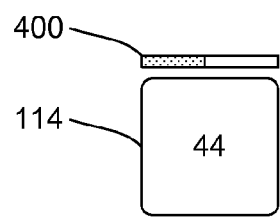
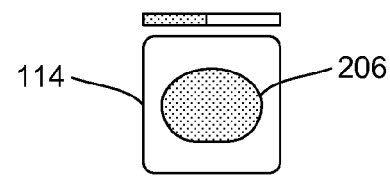
FIG. 3A    FIG. 3B
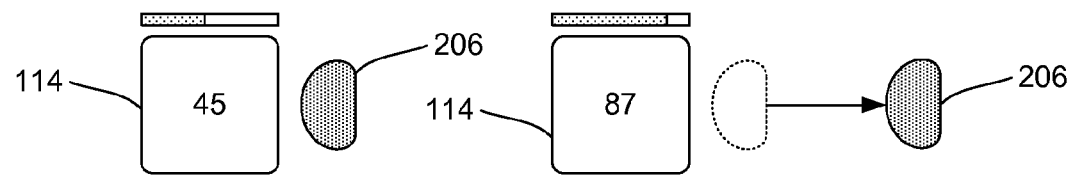
FIG. 3C    FIG. 3D

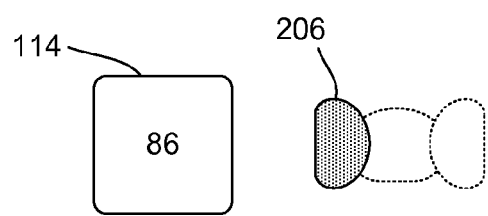
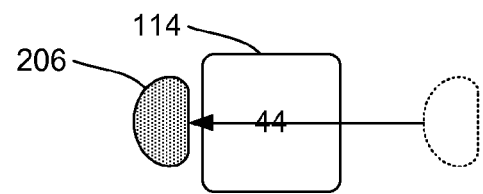
FIG. 3E          FIG. 3F
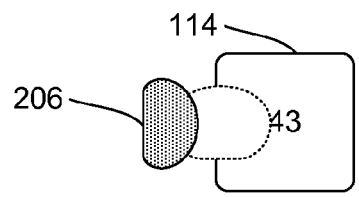
FIG. 3G

GESTURAL CONTROL FOR QUANTITATIVE INPUTS

BACKGROUND

Gestural interactions enable users to interact efficiently with touch interfaces, often without visual features that consume screen space in the user interface. For example, many devices with a touch screen, for example, allow a user to touch the screen with a finger, slide the finger across the screen, perform multi-touch gestures with more than one finger, and other gestural actions to perform a function in the user interface.

In certain devices, including smart phones and other mobile devices, screen space can be very limited and valuable. Interface controls for controlling aspects of the user interface related to the device operating system and applications within the user interface can take up a substantial portion of the screen space, leaving less room for other content and potentially making adjustments to the user interface aspects via the interface controls more difficult.

SUMMARY

Embodiments of a system are described. In one embodiment, the system is a gestural control system. The system includes: a touch display device configured to display an interface control in a user interface, wherein the interface control is an interactive interface element configured to set an interface value selected from an ordered continuum of values; and a gesture detection engine configured to: detect a shape of a touch gesture input on the interface control on the touch display device; and change the interface value in response to detecting a change in the shape of the gesture input. Other embodiments of the system are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

FIGS. 3A-3G depict schematic diagrams of one embodiment of the interface control of FIG. 1.

Throughout the description, similar reference numbers may be used to identify similar elements.

DETAILED DESCRIPTION

Figure 1:
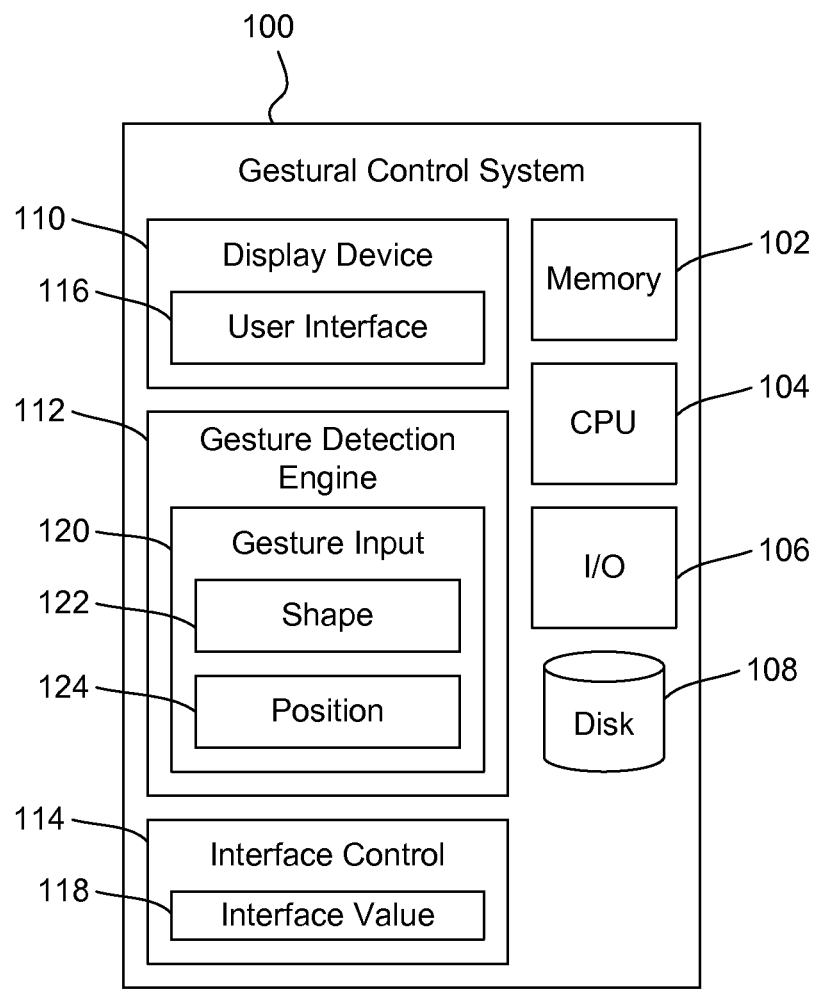
FIG. 1 depicts a schematic diagram of one embodiment of a gestural control system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

While many embodiments are described herein, at least some of the described embodiments present a system and method for gestural control for quantitative inputs. More specifically, the system is able to detect the shape of the gesture input and modify the interface value corresponding to the interface control in response to changes in the shape of the gesture input. The gesture input may allow for both fine-grained and course-grained changes to the interface value. In one embodiment, the system detects a change in position of the gesture input relative to the interface control and adjusts the gain of the interface value changes in response to the change in position.

In some conventional systems, interface controls include visual features in the user interface—such as up/down buttons, roller controls, slider widgets, and others—that allow the user to modify the interface values associated with the interface controls. For devices with small screens, such as many mobile devices, the visual features for the interface controls can take up a significant amount of screen space. Conversely, a system and method that allows the user to modify the interface values for the interface controls without the need for visual features may free up screen space while still providing a simple, intuitive way to modify and set the interface values.

Figure 4:
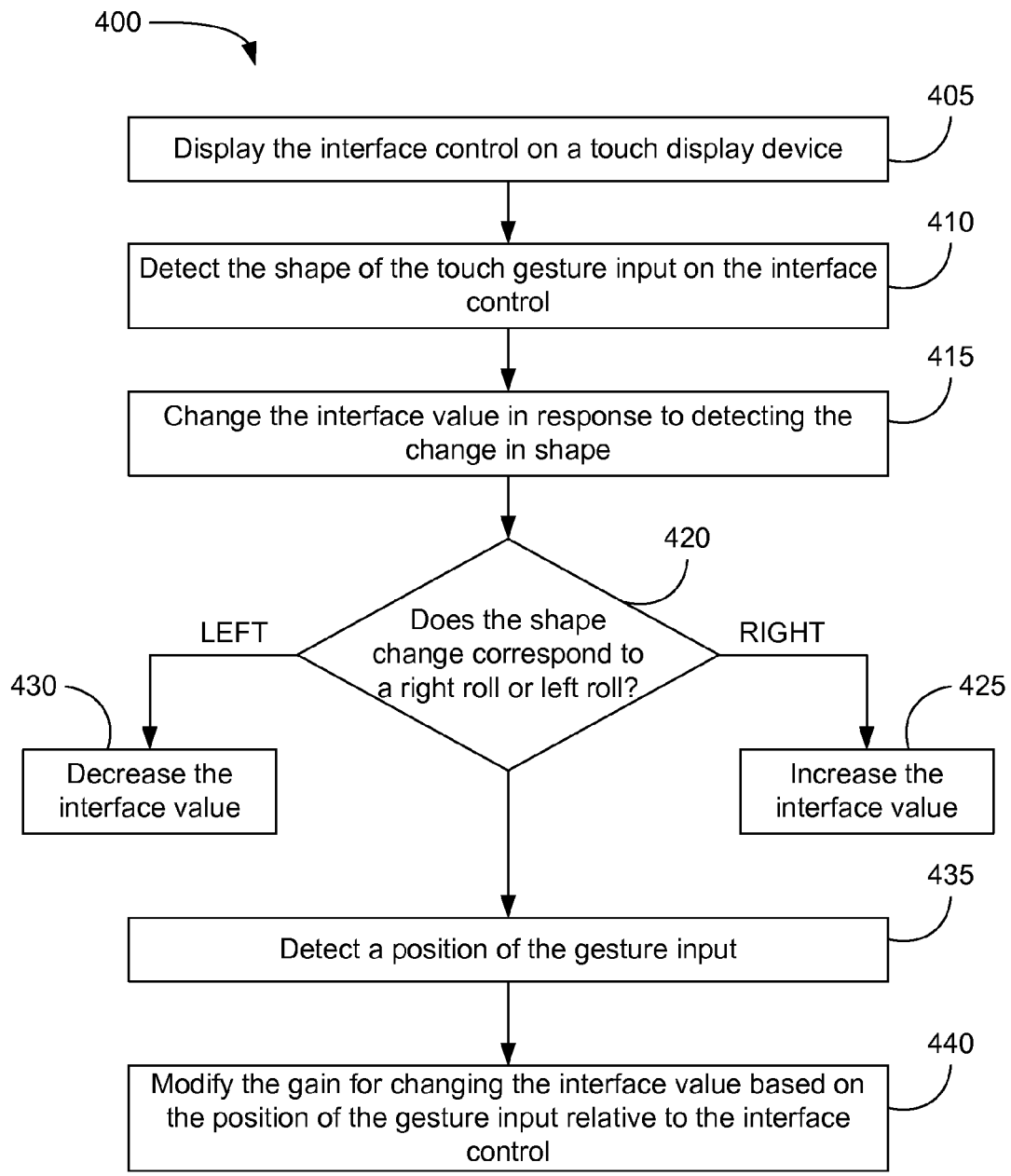
FIG. 4 depicts one embodiment of a method for gesture control of a quantitative input.

FIG. 1 depicts a schematic diagram of one embodiment of a gestural control system. The depicted gestural control system 100 includes various components, described in more detail below, that are capable of performing the functions and operations described herein. In one embodiment, at least some of the components of the gestural control system 100 are implemented in a computer system. For example, the functionality of one or more components of the interface control system 100 may be implemented by computer program instructions stored on a computer memory device 102 and executed by a processing device 104 such as a CPU. The gestural control system 100 may include other components, such as a disk storage drive 108, input/output devices 106, a display device 110, a gesture detection engine 112, and an interface control 114. Some or all of the components of the gestural control system 100 may be stored on a single computing device or on a network of computing devices, including a wireless communication network. The gestural control system 100 may include more or fewer components or subsystems than those depicted herein. In some embodiments, the gestural control system 100 may be used to implement the methods described herein as depicted in FIG. 4.

In one embodiment, the gestural control system 100 is used in conjunction with a device having a touch display device 110 capable of interpreting touch gestures. The touch gestures may be used to perform various actions in the computer system. The computer system may be any device for use with a touch display device 110, such as a smart phone, a portable media device, a desktop computer, a laptop computer, a tablet computer, or other device.

The display device 110 is an input/output device configured to display a user interface 116 corresponding to the specific computer system. The computer system may also include other input/output devices that allow the user to interact with the user interface 116. Operations for the gestural control system 100 may be coded into an application programming interface (API) for the user interface 116. Alternatively, operations for the gestural control system 100 may be coded into an API for a specific application operable in the user interface 116. The interface control 114 may be displayed in the user interface 116 and is an interactive interface element configured to set an interface value 118 corresponding to some aspect of the user interface 116 or the computer system. The interface value 118 may be selected from an ordered continuum of values. The aspects of the user interface 116 include aspects of components within the user interface 116, including windows, browsers, widgets, or other components. For example, the interface control 114 may set a value for a setting corresponding to a particular application in the user interface 116.

The value controlled by the interface control 114 may be an ordered or numerical value corresponding to or representing the aspect of the user interface 116. Aspects that may be represented as a continuum of values, such as colors, may also generally be represented using numerical values. Consequently, the interface control 114 may be used to control a variety of aspects of a user interface 116. The user interface 116 may include an interface control 114 for each aspect of the user interface 116 that may be modified by the user.

In one embodiment, the gesture detection engine 112 is configured to modify the interface value 118 for the interface control 114 based on a touch gesture input 120 on the display device 110. The gesture detection engine 112 detects the shape 122 of the gesture input 120 on the display device 110 and changes the interface value 118 if the shape 122 of the gesture input 120 changes in specific, predetermined ways. For example, the gesture detection engine 112 may be able to detect that the user performs a right roll or left roll of a finger touching the display device 110 by determining that the shape 122 of the gesture input 120 changes in a manner corresponding to either a right roll or left roll. The gesture detection engine 112 may then modify the interface value 118 according to the type of detected gesture.

The gesture detection engine 112 may also modify the gain of the change in interface value 118. The gain may determine the rate at which the interface value 118 changes, such that the interface value 118 changes in larger or smaller increments. In one embodiment, the gesture detection engine 112 is configured to detect a position 124 of the gesture input 120 and to modify the gain due to any detected change of the position 124 of the gesture input 120 relative to the position of the interface control 114. Thus, the gain of the change in interface value 118 may increase or decrease to allow for finer- or coarser-grained changes in the interface value 118.

Figure 2:
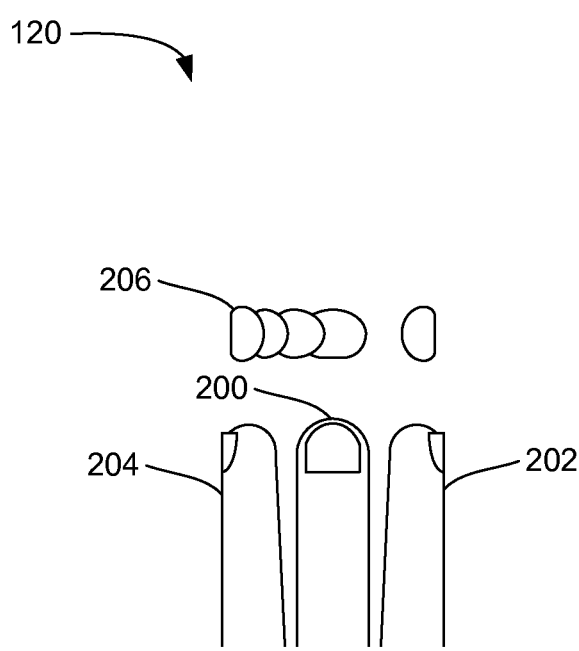
FIG. 2 depicts a schematic diagram of one embodiment of the gesture input of FIG. 1.

FIG. 2 depicts a schematic diagram of one embodiment of the gesture input 120 of FIG. 1. When a user performs a gesture action on a touch display device 110, such as pressing a fingertip on a portion of the display device 110, the area and shape 122 of the fingerprint or contact area 206 on the display device 110 varies with the orientation of the fingertip relative to the glass. In various embodiments, the shape 122 of the contact area 206 is defined by the area of the contact area 206, a perimeter of the contact area 206, dimensional bounds of the contact area 206, or other physical properties of the contact area 206.

For example, if the user first touches the screen with the fingertip flat against the display device 110 and then rolls the finger to the right or left, the position 124 and orthography of the fingerprint varies, as shown in the present embodiment. The contact area 206 may be comparatively larger when the fingertip is pressed flat against the display device 110 than when the fingertip is rolled to one side. Additionally, the shape 122 of the contact area 206 may be thinner when the fingertip is rolled to one side than when the fingertip is pressed flat on the display device 110 in a center position 200 because less of the fingertip is able to touch the display device 110 on the side of the fingertip in a right position 202 or a left position 204. In other embodiments, the gesture action may include gesture actions other than those described herein.

These shape 122 and area changes may be sensed by the gestural control system 100 and used to define the operations performed by the gestural input. In one embodiment, the gestural control system 100 captures the shape 122 of the contact area 206 at multiple points on the display device 110, such that the gestural control system 100 is able to interpret the movement of the gesture action.

In one embodiment, the gestural control system 100 includes a mapping of contact areas 206 corresponding to different positions of the fingertip when contacting the display device 110. The contact area 206 of the fingertip may be matched to the mapping, for example, and the corresponding contact area 206 in the mapping may be selected. The operation corresponding to the matched contact area 206 may then be performed. Other methods of recognizing the shape 122 of the contact area 206 or selecting the appropriate operation may be used.

FIGS. 3A-3G depict schematic diagrams of one embodiment of the interface control 114 of FIG. 1. While the gestural control system 100 is described herein in conjunction with the interface control 114 of FIGS. 3A-3G, the gestural control system 100 may be used in conjunction with any interface control 114.

In the present embodiment, the interface control 114 includes a visual artifact, such as an icon or bounding box, that displays the current setting for the interface value 118. The interface control 114 may also or alternatively include an optional bar 300 or other indicator that displays the current position of the interface value 118 relative to a range of possible values. If the nature of the presented information being controlled has an inherent range, such as a range of colors defined at extremes by different colors, or if the presented information is unbounded, no bar 300 may be necessary. The bar 300 may be particularly useful when there is a range of values that is not implicit in the information displayed, such as for numerical values. The bar 300 may be hidden when the interface control 114 is not currently in an edit mode, such that the bar 300 may indicate when the interface control 114 has received a gesture input 120. The visual artifact may also be hidden until the interface control 114 enters edit mode. The interface control 114 may be any size on the display device 110.

In other embodiments, the interface control 114 may be any ordered value capable of being changed. For example, the gestural control system 100 may automatically detect a numerical value displayed as text in a document or application. The numerical value may be altered by the gestural control system 100 in response to a gesture input 120 on the text. The gestural control system 100 may inspect the characters between two blank spaces at the location of the gesture input 120 and determine that the characters correspond to a numerical value. In some embodiments, a bounding box may be displayed around the detected numerical value upon entering edit mode to indicate that the numerical value may be changed.

When the user presses a fingertip on the interface control 114 such that the fingertip is flat on the display device 110, the contact area 206 of the fingertip on the display device 110 may appear as shown in FIG. 3B. In one embodiment, the gestural control system 100 is able to determine that the shape 122 of the contact area 206 corresponds to the shape 122 of a fingertip pressed flat.

The interface control 114 enters edit mode in response to the gesture input 120. When the interface control 114 is in edit mode, the interface value 118 corresponding to the interface control 114 may be modified by performing further gestural actions. The interface control 114 may exit edit mode in response to detecting that the gestural control system 100 is no longer receiving a gestural input—for example, if the fingertip is no longer touching the display device 110. Exiting edit mode may set the interface value 118 to the currently selected value.

In one embodiment, the user may increase the interface value 118 by rolling the fingertip to the right, as shown in FIG. 3C. The gestural control system 100 detects the change in shape 122, and recognizes that the change in shape 122 or sequence of shapes 122 corresponds to a right roll of the fingertip. The gestural control system 100 may then increment the interface value 118 according to the configuration of the interface control 114. For example, rolling the fingertip to the right may increment the interface value 118 by one or another fine-grained increment based on settings for the interface control 114. In another embodiment, the user rolls the fingertip to the left and the gestural control system 100 decrements the interface value 118 in response to detecting the change in shape 122.

In one embodiment, the interface value 118 may continue incrementing at a predetermined rate as long as the user maintains contact with the right side of the fingertip. If the user removes the fingertip from contacting the display device 110, or if the user rolls the fingertip back to pressing flat against the display device 110, the interface value 118 may stop incrementing. In one embodiment, the speed at which the interface value 118 increments may increase if the user holds the fingertip at the right position 202 for a predetermined amount of time. The user may increment the interface value 118 more slowly by rocking the finger back and forth from the flat position to the right position 202. Alternative embodiments may increment the value at other speeds or using other criteria.

In one embodiment, the user is able to modify the gain at which the interface value 118 changes by changing the position 124 of the gesture action on the display device 110. For example, as shown in FIG. 3D, when the fingertip is in the right position 202 for incrementing the interface value 118, the user may slide the fingertip to the right and away from the interface control 114 to increase the gain at which the interface value 118 is incrementing. This allows the user to increment the interface value 118 faster or in larger steps. When the fingertip is in the left position 202 for decrementing the interface value 118, the user may slide the fingertip to the left and away from the interface control 114 to increase the gain at which the interface value 118 is decrementing. The amount of gain in the change in interface value 118 may be determined by the distance of the contact area 206 from the interface control 114. The gain may increase as the contact area 206 gets farther from the interface control 114. In another embodiment, the gain may increase a certain amount when the contact area 206 is at least at a predetermined distance from the interface control 114 or for a predetermined amount of time in a right position 202 or a left position 202.

In one embodiment, as shown in FIG. 3E, when the fingertip is in the right position 202, the user may roll the fingertip to the left position 202 to decrement the interface value 118 from the currently incremented interface value 118. Conversely, when the fingertip is in the left position 202, the user may roll the fingertip to the right position 202 to increment the interface value 118 from the currently decremented interface value 118. In one embodiment, the user may implement fine-grained adjustments by rolling to the left or to the right at any time or in any location on the display screen while the interface control 114 is in edit mode. Thus, the user may increment or decrement the interface value 118 at any time while the interface control 114 is in edit mode by rolling the fingertip to the right position 202 or the left position 202, respectively.

In one embodiment, the gestural control system 100 stored the starting point of the interface value 118 when the interface control 114 enters edit mode. If the user has modified the interface value 118 while the interface is in edit mode, the user may reset the interface value 118 to the starting point. In one embodiment, this is accomplished by dragging the fingertip across the interface control 114, as in FIG. 3F. This action may create a virtual "detent" that prevents further change of the interface value 118 from the starting point. When the contact area 206 is positioned to the right of the interface control 114, the user may drag the fingertip to the left across the interface control 114 to reset the interface value 118 to the starting point. Conversely, when the contact area 206 is positioned to the left of the interface control 114, the user may drag the fingertip to the right across the interface control 114 to reset the interface value 118 to the starting point.

In one embodiment, the user maintains the fingertip in the same rotate position, i.e., in the right position 202, while dragging the fingertip across the interface control 114. In some embodiments, the contact area 206 may be any shape 122 as the user moves the fingertip across the interface control 114 to reset the interface value 118 to the starting point, such that the user may not need to maintain the fingertip in the same rotated/un-rotated position while swiping the fingertip across the interface control 114.

After resetting the interface value 118 by swiping the fingertip across the interface control 114, the user may overcome the virtual detent by rolling the fingertip back to the flat or center position 200. In another embodiment, the user overcomes the detent by waiting for a predetermined amount of time after crossing the interface control 114 while in edit mode without performing additional gesture actions. Once the detent has been deactivated, the user may then roll the fingertip to the left position 202, as shown in FIG. 3G, to begin decrementing the value. Conversely, for an embodiment in which the user swipes the fingertip across the interface control 114 to the right, the user may roll the fingertip to the right position 202 to begin incrementing the value once the detent has been deactivated.

FIG. 4 depicts one embodiment of a method 400 for gesture control of a quantitative input. Although the method 400 is described in conjunction with the gestural control system 100 of FIG. 1, embodiments of the method 400 may be implemented with other types of gestural control systems 100.

In one embodiment, the gestural control system 100 is configured to display 405 the interface control 114 in the user interface 116 on a touch display device 110. The interface control 114 is any interface element configured to set an interface value 118 selected from an ordered continuum of values. The interactive element may be any feature, including a set control or text numeric value, which may be changed by the user to set the interface value 118 corresponding to some aspect of the user interface 116.

The gestural control system 100 receives a touch gesture input 120 on the interface control 114 on the display device 110. The display device 110 may be part of a mobile device, a desktop computer, a smart phone, a tablet, a laptop, or other computing device. The gesture input 120 may be any touch gesture on the display device 110, such as a finger gesture using a fingertip on the display device 110. The system 100 is configured to detect 410 the shape 122 of the gesture input 120. The system 100 may detect an initial shape 122 of the gesture input 120 on the interface control 114 to begin operating the interface control 114. For example, the system 100 detects the shape 122 of the fingertip of the user when the fingertip is pressed against the display device 110. The shape 122 may vary depending on the portion of the fingertip that is touching the display device 110.

The system 100 then changes 415 the interface value 118 in response to detecting a change in the shape 122 of the gesture input 120. For example, the system 100 determines 420 whether the shape change corresponds to a right roll or a left roll. The system 100 may increase 425 the interface value 118 in response to detecting that the change in the shape 122 of the gesture input 120 corresponds to a right roll of the gesture input 120, and the system 100 may decrease 430 the interface value 118 in response to detecting that the change in the shape 122 of the gesture input 120 corresponds to a left roll of the gesture input 120. For example, if the user presses the fingertip flat against the display device 110 on the interface control 114 to enter edit mode and then rolls the fingertip to the right, such that the right side of the fingertip is touching the display device 110, the interface value 118 may increment. If the user rolls the fingertip to the left, such that the left side of the fingertip is touching the display device 110, the interface value 118 may decrement. When the user removes the gesture input 120 from the display device 110, the system 100 may set the interface value 118 to a current selected value in a range of possible values.

In one embodiment, the system 100 is also configured to detect 435 a change in the position 124 of the gesture input 120 for the interface control 114. The position 124 of the gesture input 120 may change as the user performs the gesture input 120 to change the interface value 118. The system 100 may modify 440 the gain for changing the interface value 118 based on the position 124 of the gesture input 120 relative to the position of the interface control 114 on the display device 110. While the interface control 114 is in an edit mode—i.e. the gesture input 120 is active—the user may move the gesture input 120 toward or away from the interface control 114. In one embodiment, the gain for the change in interface value 118 increases as the gesture input 120 moves farther away from the interface control 114. If the gesture input 120 moves closer to the interface control 114, the gain decreases. The gain may control either the speed at which the interface value 118 changes or the step sizes at which the interface value 118 changes.

The system 100 may be configured to store a starting point for the interface value 118 when the user first performs an initial gesture input 120 on the interface control 114 to place the interface control 114 in edit mode. The starting point corresponds to the interface value 118 when the initial gesture input 120 is received by the system 100. If the user changes the interface value 118 and then desires to return to the starting point, the user may perform a predetermined gesture that the system 100 recognizes and the interface value 118 is returned to the starting point. The predetermined gesture may be determined by default settings or by the user. In one embodiment, the predetermined gesture includes sliding the fingertip across the interface control 114 to the opposite side of the interface control 114, whether from the right or the left side of the interface control 114.

An embodiment of a gestural control system 100 includes at least one processor coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, including an operation for gesture control of a quantitative input.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer program product, comprising:
a non-transitory computer readable storage medium to store a computer readable program, wherein the computer readable program, when executed by a processor within a computer, causes the computer to perform operations for gesture control of a quantitative input, the operations comprising:
detecting a numerical value displayed as text in an application;
entering an edit mode in response to detecting a touch gesture input on the numerical value on a touch display device;
displaying an interface control in a user interface on the touch display device for the numerical value in response to entering the edit mode, wherein the interface control is an interactive interface element configured to set an interface value for the numerical value, the interface value selected from an ordered continuum of values;
changing the interface value for the numerical value in response to detecting a change in the shape of the gesture input while in the edit mode, wherein the shape varies throughout a range of lateral and anterior shapes of a fingertip of a user as the fingertip is rolled;
detecting a change in a position of the gesture input for the interface control on the touch display device while in the edit mode; and
while in the edit mode modifying a gain for changing the interface value based on the change in the position of the gesture input relative to a position of the interface control, wherein the gain is a rate at which the interface value changes in larger or smaller step size increments based on the position of the gesture input relative to the position of the interface control.

2. The computer program product of claim 1, wherein a speed of incrementing or decrementing the numerical value increases when the change in the shape is maintained for a predetermined amount of time.

3. The computer program product of claim 1, wherein changing the interface value further comprises:
increasing the interface value in response to detecting that the change in the shape of the gesture input corresponds to a right roll of the gesture input; and
decreasing the interface value in response to detecting that the change in the shape of the gesture input corresponds to a left roll of the gesture input.

4. The computer program product of claim 1, wherein the computer readable program, when executed on the computer, causes the computer to perform additional operations, comprising:
storing a starting point for the interface value in response to receiving an initial gesture input on the interface control, wherein the starting point corresponds to the interface value when the initial gesture input is received; and
returning the interface value to the starting point in response to receiving a predetermined gesture.

5. The computer program product of claim 1, wherein detecting the shape of the touch gesture input further comprises detecting an initial shape of the gesture input on the interface control to begin operating the interface control.

6. The computer program product of claim 1, wherein the computer readable program, when executed on the computer, causes the computer to perform additional operations, comprising:
setting the interface value to a current selected value in response to detecting that the gesture input is removed from the display device.

7. A method for value specification in a responsive interface control, the method comprising:
detecting a numerical value displayed as text in an application;
entering an edit mode in response to detecting a touch gesture input on the numerical value on a touch display device;
displaying an interface control in a user interface on the touch display device for the numerical value in response to entering the edit mode, wherein the interface control is an interactive interface element configured to set an interface value for the numerical value, the interface value selected from an ordered continuum of values;
changing the interface value for the numerical value in response to detecting a change in the shape of the gesture input while in the edit mode, wherein the shape varies throughout a range of lateral and anterior shapes of a fingertip of a user as the fingertip is rolled;
detecting a change in a position of the gesture input for the interface control on the touch display device while in the edit mode; and
while in the edit mode modifying a gain for changing the interface value based on the change in the position of the gesture input relative to a position of the interface control, wherein the gain is a rate at which the interface value changes in larger or smaller step size increments based on the position of the gesture input relative to the position of the interface control.

8. The method of claim 7, wherein a speed of incrementing or decrementing the numerical value increases when the change in the shape is maintained for a predetermined amount of time.

9. The method of claim 7, wherein changing the interface value further comprises:
increasing the interface value in response to detecting that the change in the shape of the gesture input corresponds to a right roll of the gesture input; and
decreasing the interface value in response to detecting that the change in the shape of the gesture input corresponds to a left roll of the gesture input.

10. The method of claim 7, further comprising:
storing a starting point for the interface value in response to receiving an initial gesture input on the interface control, wherein the starting point corresponds to the interface value when the initial gesture input is received; and
returning the interface value to the starting point in response to receiving a predetermined gesture.

11. The method of claim 7, wherein detecting the shape of the touch gesture input further comprises detecting an initial shape of the gesture input on the interface control to begin operating the interface control.

12. The method of claim 7, further comprising:
setting the interface value to a current selected value in response to detecting that the gesture input is removed from the display device.

13. A gestural control system, comprising:
a touch display device configured to display a user interface; and
a processor configured to detect a numerical value displayed as text in an application on the touch display device;
a gesture detection engine configured to:
enter an edit mode in response to detecting a touch gesture input on the numerical value;
display an interface control for the numerical value in the user interface in response to entering the edit mode, wherein the interface control is an interactive interface element configured to set an interface value for the numerical value, the interface value selected from an ordered continuum of values;
change the numerical value in response to detecting a change in the shape of the gesture input while in the edit mode, wherein the shape varies throughout a range of lateral and anterior shapes of a fingertip of a user as the fingertip is rolled;
detect a change in a position of the gesture input for the interface control on the touch display device while in the edit mode; and
while in the edit mode modify a gain for changing the interface value based on the change in the position of the gesture input relative to a position of the interface control, wherein the gain is a rate at which the interface value changes in larger or smaller step size increments based on the position of the gesture input relative to the position of the interface control.

14. The system of claim 13, wherein the speed of incrementing or decrementing the numerical value increases when the change in the shape is maintained for a predetermined amount of time.

15. The system of claim 13, wherein changing the interface value further comprises:
increasing the interface value in response to detecting that the change in the shape of the gesture input corresponds to a right roll of the gesture input; and
decreasing the interface value in response to detecting that the change in the shape of the gesture input corresponds to a left roll of the gesture input.

16. The system of claim 13, wherein the gesture detection engine is further configured to:
store a starting point for the interface value in response to receiving an initial gesture input on the interface control, wherein the starting point corresponds to the interface value when the initial gesture input is received; and
return the interface value to the starting point in response to receiving a predetermined gesture.

17. The system of claim 13, wherein detecting the shape of the touch gesture input further comprises detecting an initial shape of the gesture input on the interface control to begin operating the interface control.

* * * * *